(12) United States Patent
Cho et al.

(10) Patent No.: US 8,598,972 B2
(45) Date of Patent: Dec. 3, 2013

(54) ELECTROMAGNETIC MULTI-AXIS ACTUATOR

(75) Inventors: Young-Ho Cho, Daejon (KR); Dae Geon Seo, Daegu (KR)

(73) Assignee: Korea Advanced Institute of Science and Technology, Daejon (KR)

( * ) Notice: Subject to any disclaimer, the term of this patent is extended or adjusted under 35 U.S.C. 154(b) by 131 days.

(21) Appl. No.: 13/060,236

(22) PCT Filed: Dec. 24, 2008

(86) PCT No.: PCT/KR2008/007630
§ 371 (c)(1),
(2), (4) Date: Feb. 22, 2011

(87) PCT Pub. No.: WO2010/021435
PCT Pub. Date: Feb. 25, 2010

(65) Prior Publication Data
US 2011/0148554 A1  Jun. 23, 2011

(30) Foreign Application Priority Data
Aug. 22, 2008 (KR) .................. 10-2008-0082485

(51) Int. Cl.
*H01F 7/08* (2006.01)
(52) U.S. Cl.
USPC .......................................................... 335/223
(58) Field of Classification Search
USPC ................................. 335/223–226
See application file for complete search history.

(56) References Cited

U.S. PATENT DOCUMENTS

| | | | | |
|---|---|---|---|---|
| 4,421,381 A * | 12/1983 | Ueda et al. | ................. | 359/214.1 |
| 5,543,956 A * | 8/1996 | Nakagawa et al. | ......... | 359/225.1 |
| 5,912,608 A * | 6/1999 | Asada | ............................ | 335/222 |
| 6,201,629 B1 * | 3/2001 | McClelland et al. | ...... | 359/223.1 |
| 6,201,631 B1 * | 3/2001 | Greywall | ....................... | 359/245 |
| 6,232,861 B1 * | 5/2001 | Asada | ............................ | 335/222 |
| 6,388,789 B1 * | 5/2002 | Bernstein | .................... | 359/198.1 |
| 6,404,313 B2 * | 6/2002 | Asada | ............................ | 335/222 |
| 6,731,420 B2 * | 5/2004 | Orcutt et al. | ................ | 359/223.1 |
| 6,774,445 B2 * | 8/2004 | Mutoh et al. | ................... | 257/415 |
| 6,859,121 B2 * | 2/2005 | Arima | ............................ | 335/78 |
| 6,894,823 B2 * | 5/2005 | Taylor et al. | ................... | 359/291 |
| 6,924,915 B2 * | 8/2005 | Hirose et al. | ............... | 359/199.3 |
| 8,089,673 B2 * | 1/2012 | Mizoguchi et al. | ......... | 359/202.1 |
| 8,277,667 B2 * | 10/2012 | Yang et al. | ......................... | 216/2 |
| 2006/0192885 A1 | 8/2006 | Calvet et al. | | |
| 2007/0024155 A1 | 2/2007 | Calvet et al. | | |
| 2011/0148554 A1 * | 6/2011 | Cho et al. | ...................... | 335/220 |

* cited by examiner

*Primary Examiner* — Ramon Barrera
(74) *Attorney, Agent, or Firm* — Gates & Cooper LLP

(57) ABSTRACT

An electromagnetic multi-axis actuator, which can realize small size, light weight and low power consumption while being capable of performing multi-axis motion by overcoming limitations in a driving range, compared to a typical electrostatic actuation scheme or a typical electric motor actuating scheme. The electromagnetic multi-axis actuator includes an actuating unit (1) capable of being driven in a multi-axis manner, one or more elastic parts (2) connected to the actuating unit and made of a conductive material, and one or more coil substrates (3) disposed either above or below or both above and below the elastic parts and provided with conductive coils formed thereon to form magnetic fields around the elastic parts. The multi-axis actuator having the above construction can realize high response speed while having a driving range of high power caused by low power consumption, a large displacement, and multiple axes.

20 Claims, 14 Drawing Sheets

ELECTROMAGNETIC MULTI-AXIS ACTUATOR

TECHNICAL FIELD

The present invention relates, in general, to a multi-axis actuator which is linearly movable with a minute displacement, and, more particularly, to an electromagnetic multi-axis actuator, which can realize small size, light weight and low power consumption while being capable of performing multi-axis motion by overcoming limitations in a driving range, compared to a typical electrostatic actuation scheme or a typical electric motor actuating scheme.

BACKGROUND ART

Nowadays, in order to obtain high-resolution pictures having good quality using a portable terminal, particularly in a mobile phone camera, a function of precisely and rapidly controlling the focus on a desired subject at the time of taking a picture has been gradually and now widely employed. Methods adopted to automatically control the focus on a subject may include an electronic image control method and an optical control method. Such an electronic image control method is a scheme for controlling the focus using software, and has fundamental limitations in control speed or image quality.

Generally, an optical control method, which is widely used in high-end cameras, is a method of controlling the focus on a subject by mechanically moving a lens or the like, and is disadvantageous in that a micro-motor or the like is provided or in that a large number of components are required to implement a complicated mechanism, thus making it difficult to realize a small-sized camera module.

According to a conventional technology disclosed in U.S. Patent Publication No. 2006/0192885 A1 related to such an optical control method, a lens barrel is disposed on a plate connected to a spring to use a lens for a focusing device for micro-cameras, thus adjusting the motion of the lens. This invention enables the precise adjustment of the lens using a linear spring, but is problematic in that the volume of a magnet inducing a magnetic field is large and a great force is required to move the lens barrel having a predetermined weight, and thus high voltage is necessary. Further, as another related conventional technology, there is U.S. Patent Publication No. 2007/0024155 A1. According to this invention, an actuator, in which a plurality of pillars, inducing an electrostatic force when a voltage is applied, is formed on a plate and a bottom for supporting a lens and which is thus linearly movable using the electrostatic force induced by the voltage, was proposed. However, this invention is problematic in that a driving range is limited according to the number of formed pillars and the shape of electrodes.

SUMMARY OF THE INVENTION

Accordingly, the present invention has been made keeping in mind the above problems occurring in the prior art, and an object of the present invention is to provide an electromagnetic multi-axis actuator, in which a plurality of conductive coils is manufactured in the form of substrates and stacked one on top of another, and in which elastic parts, which are movable with a large displacement, are manufactured through an MEMS process, thus realizing the small size of a multi-axis actuator and enabling the multi-axis actuator to be driven to have high output and a large displacement and to be driven at low power consumption.

In order to accomplish the above object, the present invention provides an electromagnetic multi-axis actuator, comprising an actuating unit capable of being driven in a multi-axis manner, one or more elastic parts connected to the actuating unit and made of a conductive material, and one or more coil substrates disposed either above or below or both above and below the elastic parts and provided with conductive coils formed thereon to form magnetic fields around the elastic parts.

Preferably, the elastic parts may be configured such that a plurality of elastic parts is symmetrically or asymmetrically connected to the actuating unit around the actuating unit.

Preferably, the elastic parts may form current flow paths in such a way as to partially insulate metal through anodization or to partially etch and insulate the metal through chemical etching.

Preferably, the electromagnetic multi-axis actuator may further comprise a supporting part enabling the elastic parts to be fixed thereto.

Preferably, each of the elastic parts may comprise a portion formed in a direction from outside to a center of a corresponding coil substrate so that the elastic part crosses part of the coil substrate.

Preferably, each of the elastic parts may comprise a first branch part extending from the supporting part and coming into contact with the actuating unit, and a second branch part connected to the first branch part and configured to come into contact with the actuating unit and extend to the supporting part.

Preferably, each of the elastic parts may be made of a conductor or a magnetic material, or may be formed by applying a conductive material to a surface of the elastic part.

Preferably, each of the coil substrates may comprise a substrate made of an insulator, and one or more conductive coils spirally formed on one side or both sides of the substrate, or inside of the substrate.

Preferably, the substrate may have a through hole formed in a center portion thereof.

Preferably, the conductive coils may be formed around the through hole of the substrate in shapes of one or more circular spirals or polygonal spirals.

Preferably, the conductive coils may be respectively formed in four quadrants of the substrate.

Preferably, the conductive coils may be manufactured through one of inkjet printing, screen printing, lithography, anodization, optical processing, and electrochemical plating methods.

Preferably, the substrate may be made of a ceramic material.

Preferably, the substrate may contain one or more of silicon oxide ($SiO_2$), boron oxide ($B_2O_3$), calcium oxide (CaO), Magnesium Oxide (MgO), and aluminum oxide ($Al_2O_3$).

Preferably, the substrate may be made of a magnetic material.

Preferably, the magnetic material may contain two or more of iron (Fe), cobalt (Co), nickel (Ni), manganese (Mn), magnesium (Mg), zinc (Zn), and copper (Cu).

Preferably, the coil substrates may be vertically stacked.

Preferably, one of the vertically stacked coil substrates may be electrically connected to another neighboring coil substrate through a via hole.

Preferably, the multi-axis actuator may control motion of the actuating unit by adjusting a sequence of currents applied to the plurality of elastic parts.

Preferably, the multi-axis actuator may control an actuation displacement of the actuating unit by adjusting magnitudes of currents applied to the elastic parts.

Preferably, the multi-axis actuator may control a driving direction of the actuating unit by adjusting directions of currents applied to the elastic parts.

Preferably, the multi-axis actuator may control an actuation displacement of the actuating unit by adjusting magnitudes of currents applied to the coil substrates.

Preferably, the multi-axis actuator may control a driving direction of the actuating unit by adjusting directions of currents applied to the coil substrates.

Preferably, the multi-axis actuator may control a motion of the actuating unit by adjusting a sequence of currents applied to the coil substrates.

Preferably, the electromagnetic multi-axis actuator may further comprise a capacitive sensor connected to the elastic parts and configured to measure a difference between capacitances generated due to a motion of the actuating unit.

The present invention having the above construction increases an electromagnetic force, which is a driving force, using magnetic fields formed by coil substrates manufactured through a stacking process, thus exhibiting a high response speed while having high output, large displacement and a driving range of multiple axes through low power consumption which could not be achieved in the conventional technology.

Further, the present invention uses a method of forming coils on substrates as a method of forming magnetic fields, thus greatly reducing the volume of an actuator and enabling the actuator to be driven with a large displacement, compared to a conventional electromagnetic actuator using electromagnets or permanent magnets.

Furthermore, the present invention is advantageous in that, since elastic parts which control the motion of an actuating unit are implemented as thin film structures, a complicated mechanism is simplified and the number of components is reduced compared to a conventional actuating scheme using micro-motors or electromagnets, thus realizing the small size and light weight of an actuator.

DETAILED DESCRIPTION

An electromagnetic multi-axis actuator according to the present invention includes an actuating unit capable of being driven in a multi-axis manner, one or more elastic parts connected to the actuating unit and made of a conductive material, and one or more coil substrates disposed either above or below or both above and below the elastic parts and provided with coils formed thereon to form magnetic fields around the elastic parts.

The actuating unit is an object having a predetermined mass, such as a lens, and the elastic parts are formed to be connected to the actuating unit and are made of a conductive material to allow current to flow therethrough.

Each of the elastic parts forms a current flow path, and is formed to cross part of a corresponding coil substrate so that the elastic part is subjected to the Lorentz force due to magnetic fields formed by the coil substrates formed above and below the actuating unit.

That is, each of the elastic parts includes a portion formed in a direction from the outside to the center of the coil substrate to cross part of the coil substrate.

For example, the elastic part may be formed in a "U" shape, wherein an open portion of the shape is supported by a supporting part and a closed portion thereof is connected to the actuating unit.

That is, each of the elastic parts includes a first branch part extending from the supporting part and coming into contact with the actuating unit, and a second branch part connected to the first branch part and configured to come into contact with the actuating unit and to extend to the supporting part. The first branch part and the second branch part, which are current flow paths, are a current input terminal and a current output terminal, respectively.

In this case, the supporting part fixes the ends of the elastic parts.

Each of the elastic parts is deformed by an electromagnetic force which is generated due to current applied to the elastic part and magnetic fields formed on the coil substrates.

The elastic part is deformed, so that the actuating unit connected to the elastic part is operated.

When the directions of the currents applied to the elastic parts are adjusted, the directions of the electromagnetic forces acting on the elastic parts can be adjusted, and thus the direction of the actuating unit can be controlled.

Further, the directions of the currents applied to the coil substrates are adjusted, and thus the driving direction of the actuating unit can be controlled.

Hereinafter, embodiments of the present invention will be described in detail with reference to the attached drawings.

Figure 1:
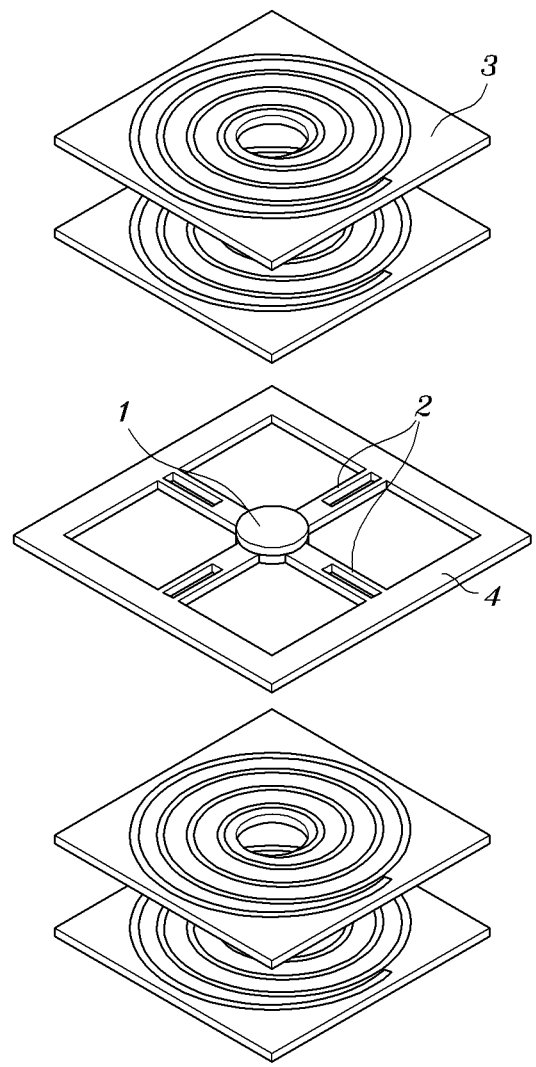
FIG. 1 is an exploded perspective view showing the construction of the present invention.

FIG. 1 is an exploded perspective view showing the construction of the present invention.

As shown in FIG. 1, a multi-axis actuator according to the present invention includes an actuating unit 1, elastic parts 2, coil substrates 3, and a supporting part 4.

The actuating unit 1 is an object of a predetermined mass which is connected to the elastic parts 2 and is driven in a multi-axis manner by the motion of the elastic parts 2.

For example, the actuating unit 1 may be a portion such as a lens in a mobile phone camera or the like. As will be described later, the actuating unit can perform linear motion with a minute displacement, such as vertical motion, horizontal motion or rotational motion, that is, can be driven in a multi-axis manner, by the electromagnetic force acting on the elastic parts 2.

The supporting part 4 is a means for supporting the elastic parts 2 and has the shape of a frame enclosing the actuating unit 1.

The supporting part 4 is connected to second ends of the elastic parts 2 and is made of an insulator.

The supporting part 4 may be formed on the same plane as the plurality of adjacent elastic parts 2, or may be formed to upwardly support the elastic parts 2 from underneath the elastic parts 2.

The plurality of elastic parts 2 may be symmetrically or asymmetrically connected to the actuating unit 1 around the actuating unit in a radial direction, and may be supported by the supporting part 4.

That is, first ends of the elastic parts 2 are connected to the actuating unit 1 and the second ends are fixed to the supporting part 4.

As the number of elastic parts 2 symmetrically or asymmetrically connected around the actuating unit 1 increases, the actuating unit 1 can be more precisely operated.

Further, the elastic parts 2 may be connected to a capacitive sensor capable of measuring the difference between capacitances generated due to the motion of the actuating unit 1.

In the elastic parts 2, current flow paths may be formed so that the elastic parts 2 are subjected to the Lorentz force which is an electromagnetic force. Each of the elastic parts 2 includes a portion formed in a direction from the outside to the center of a corresponding coil substrate 3 so that the portion crosses part of the coil substrate 3.

For example, the elastic part may be formed in a "U" shape, with an open portion fixed to the supporting part and a closed end portion connected to the actuating unit.

That is, each of the elastic parts 2 includes a first branch part extending from the supporting part 4 and coming into contact with the actuating unit 1, and a second branch part connected to the first branch part and configured to come into contact with the actuating unit 1 and then extend to the supporting part 4. That is, the first branch part and the second branch part may be electrically connected to each other.

Each of the elastic parts 2 may be manufactured in such a way that first and second branch parts which are current flow paths are formed by partially insulating a single conductor through anodization or chemical etching. The first branch part and the second branch part which are the current flow paths are a current input terminal and a current output terminal, respectively.

The elastic part 2 is deformed by an electromagnetic force which is generated due to current applied to the elastic part 2 and magnetic fields formed on the coil substrates 3.

The elastic part 2 is deformed, so that the actuating unit 1 connected to the elastic part 2 is operated.

When the direction of current applied to the elastic part 2 is adjusted, the direction of the electromagnetic force acting on the elastic part 2 can be adjusted, and thus the direction of motion of the actuating unit 1 can be controlled.

When the number of elastic parts 2 connected to the actuating unit 1 is plural, the sequence of currents applied to the elastic parts 2 is adjusted, so that electromagnetic forces acting on the elastic parts 2 are sequentially generated, thus enabling the motion of the actuating unit 1 to be controlled.

Further, the magnitudes of currents applied to the elastic parts 2 are adjusted, and thus the magnitude of the actuation displacement of the actuating unit 1 can be controlled.

The actuating unit 1 can be operated such that, after it has been driven using the electromagnetic force generated due to the currents applied to the elastic parts 2 and the magnetic fields formed on the coil substrates 3, the actuating unit 1 is restored to its original state using only the restoring force of the elastic parts 2.

The shape of the elastic parts 2 may be modified into various shapes as long as the elastic parts 2 enable the formation of paths along which current flows from the supporting part 4 to the actuating unit 1.

The elastic parts 2 are formed based on a Micro-Electro-Mechanical Systems (MEMS) actuator manufactured through an MEMS process, and are made of a conductive material as a basic material. Therefore, the material of the elastic parts 2 may be a conductor or a magnetic material or may be an insulating material to which a conductive material is applied.

Such an elastic part 2 may be manufactured using one of mechanical processing, chemical etching, optical processing, and electromechanical plating methods.

The coil substrates 3 are disposed either above or below or both above and below the elastic parts 2, and are implemented using conductive coils each formed on the surface or inside of the substrate.

For example, each coil substrate 3 may include a substrate made of an insulator and one or more conductive coils spirally formed on one side or both sides of the substrate.

Preferably, one or more coil substrates 3 are disposed above and below the elastic parts 2 and the actuating unit 1.

The coil substrates 3 may be formed in a structure in which one or more coil substrates 3 are three-dimensionally stacked one on top of another through a Low-Temperature-Cofired Ceramic (LTCC) process, and the thickness of each coil substrate is about several μm.

Here, in relation to a method of stacking one or more coil substrates 3, the coil substrates may be uniformly aligned in a vertical direction or may be alternately stacked.

Further, a through hole may be formed at the center of each coil substrate.

When a plurality of coil substrates 3 is stacked, through holes may be formed to have the same size or different sizes for respective coil substrates.

When coil substrates 3 having through holes of different sizes are stacked, a stacked structure may be implemented in such a way that the coil substrates are stacked with the sizes of through holes sequentially varying.

In this case, after the coil substrates 3 have been stacked, the through holes may be formed.

Alternatively, after a through hole has been primarily formed in a single coil substrate 3, through holes may be formed by stacking the coil substrates 3.

A nonconductor layer may be further formed between a coil substrate 3 and a neighboring coil substrate 3. An air layer may be used as the nonconductor layer.

In the coil substrates 3, via holes may be formed.

One or more coil substrates 3 which are vertically separated and arranged are electrically connected to each other through the via holes. The via holes for electric connection paths between the coil substrates 3 may be formed using one of mechanical processing, chemical etching, anodization, and optical processing methods.

The coil substrates 3 may be replaced with other parts, such as magnet layers capable of forming magnetic fields.

Here, the electrodes of the coil substrates 3 may be made of a material such as silver (Ag), Copper (Cu) or other conductive materials, and may be manufactured in such a way as to flatten the surfaces of the coil substrates 3 using mechanical processing or chemical etching.

As described above, each coil substrate 3 includes a substrate and one or more conductive coils.

First, the substrate may have one of various shapes, such as a circular shape and a polygonal shape, and a through hole is formed in the center portion of the substrate. The substrate is made of, as a basic material, a ceramic material having glass used in a Low Temperature Cofired Ceramic (LTCC) process as a main component. As the material of the substrate, a ceramic material which contains one or more of silicon oxide (SiO2), boron oxide (B2O3), calcium oxide (CaO), Magnesium Oxide (MgO), and aluminum oxide (Al2O3) as a main component may be used.

Further, as the material of the substrate, silicon, a conductor or a nonconductor may be used, and a magnetic material containing two or more elements of iron (Fe), cobalt (Co), nickel (Ni), manganese (Mn), magnesium (Mg), zinc (Zn) and copper (Cu), each having predetermined magnetic permeability, may also be used. Also usable as the material is a magnetic material, having magnetic permeability, mixed with a ceramic material other than the magnetic material.

As described above, the through hole formed in the substrate may be manufactured through one of mechanical processing, chemical etching, and laser processing methods.

The conductive coils may be formed on one side or both sides of the coil substrate around the through hole.

The conductive coils are spirally formed.

When conductive coils are formed on both sides of the substrate, they may be connected to each other through the through hole.

Further, such a conductive coil may be formed to be entirely or partially inserted into the substrate.

Further, a plurality of conductive coils may be arranged in a circular or polygonal shape to enclose the through hole of the coil substrate 3, or may be respectively arranged in four quadrants around the through hole. The shapes of the conductive coils arranged in each quadrant may be changed depending on the shape of a coil substrate.

The directions and sequence of currents applied to respective conductive coils are adjusted, and thus the driving direction and motion of the actuating unit can be controlled. The magnitudes of currents applied to the conductive coils are adjusted, and thus the magnitude of the actuation displacement of the actuating unit 1 can be controlled.

Such a conductive coil is made of a conductive material such as silver (Ag) or copper (Cu) which enables current to flow therethrough, and may be manufactured using one of ink jet printing, screen printing, lithography, anodization, optical processing, and electrochemical plating methods.

The conductive coil may control the direction of a magnetic field by adjusting the direction of applied current, and may control the driving direction of the actuating unit 1 by adjusting the directions of electromagnetic forces acting on the elastic parts 2. The magnitude of the actuation displacement of the actuating unit 1 can be controlled by adjusting the magnitude of current applied to the coil. When there is a plurality of coils, electromagnetic forces acting on the elastic parts 2 are sequentially generated by adjusting the sequence of currents applied to the coils, thus enabling the motion of the actuating unit 1 to be controlled.

In the actuator of the present invention, an electromagnetic force acting on an elastic part 2 is given by the following Equation 1.

$$\vec{F} = \int I d\vec{l} \times \vec{B}$$ [Equation 1]

In Equation 1, F is a magnetic force, I is an input current, l is the length of a conducting wire, and B is a magnetic field. The intensity of the magnetic field B is represented by the following Equation 2.

$$B = \mu n I$$ [Equation 2]

In Equation 2, $\mu$ is magnetic permeability of a material, n is the number of windings of the conducting wire, and I is the magnitude of input current.

That is, the intensity of the magnetic field is proportional to the magnetic permeability of a material, the number of windings of a conducting wire and the magnitude of current. When each element is increased, the intensity of the magnetic field is increased, and thus the intensity of the magnetic force can be increased.

The operating principle of the electromagnetic multi-axis actuator according to the present invention will be described below.

When currents having a certain direction and a certain magnitude are made to flow through the conductive coils formed on the coil substrates 3, magnetic fields are formed around the coil substrates 3. At this time, when currents having a certain direction and a certain magnitude are made to flow through the elastic parts 2, electromagnetic forces having a certain direction and a certain magnitude are generated on the elastic parts 2, so that the elastic parts 2 are moved depending on the directions and magnitudes of the electromagnetic forces, and thus the motion of the actuating unit 1 connected to the elastic parts 2 can be controlled.

In order to control the displacement and the amount of rotation of the actuating unit 1, the magnitudes, directions and application sequence of currents flowing through the elastic parts 2 or the coil substrates 3 may be adjusted. When currents flowing through the elastic parts 2 or coils are cut off, the actuating unit 1 is restored to its original position because of the restoring force of the elastic parts 2.

Figure 2:
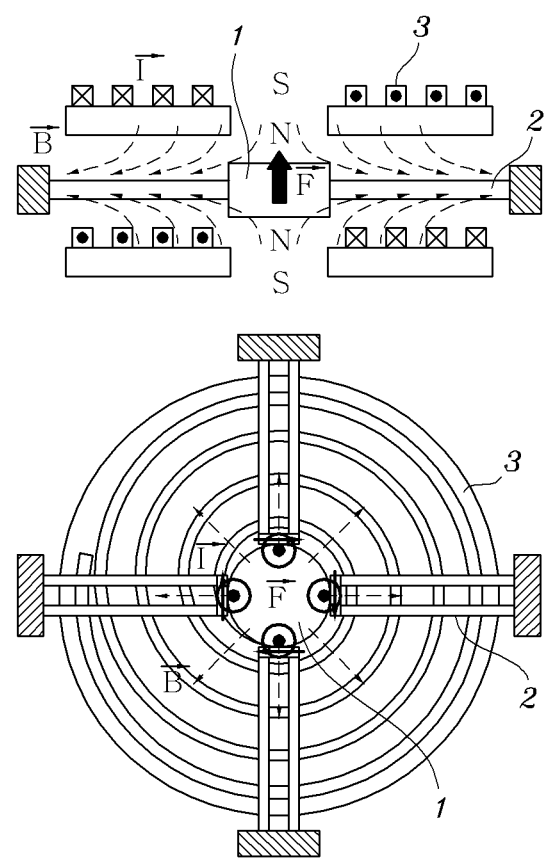
FIGS. 2 and 3 are views showing embodiments of an operating method according to the present invention, which show in detail the movement operation of an actuating unit in an upward vertical direction.
Figure 3:
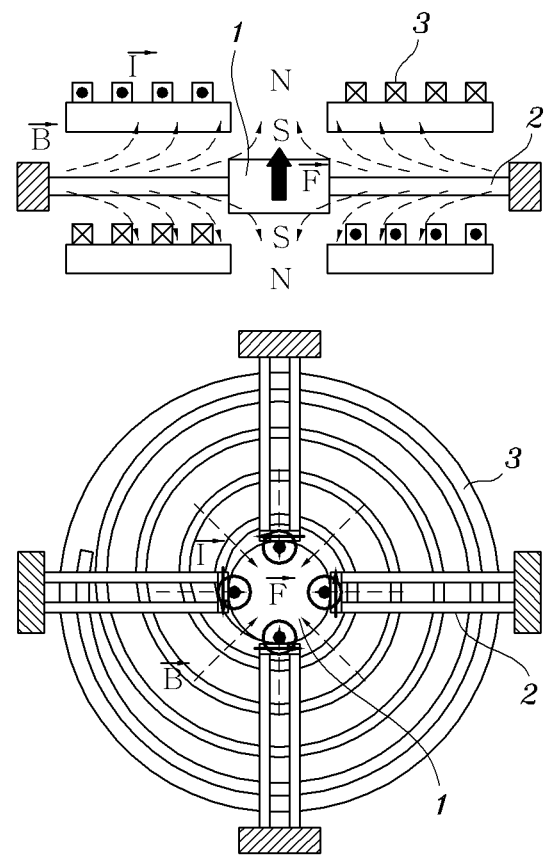

FIGS. 2 and 3 are diagrams showing embodiments of an operating method according to the present invention, which show in detail the movement operation of the actuating unit 1 in an upward vertical direction.

First, in FIG. 2, when clockwise current is caused to flow through the coils of the coil substrates 3 disposed above the actuating unit 1 (hereinafter referred to as a first coil part), and counterclockwise current is caused to flow through the coils of the coil substrates 3 disposed below the actuating unit 1 (hereinafter referred to as a second coil part), magnetic fields are formed downwards from the first coil part, and are formed upwards from the second coil part. In other words, the magnetic fields are formed towards the elastic parts 2. In this case, since the magnetic fields formed on respective coil parts towards the elastic parts 2 have the same polarity, they repel each other, thus enabling the magnetic fields to be formed in opposite directions around the actuating unit 1. When currents are caused to flow through the elastic parts 2 in the direction shown in FIG. 2, the elastic parts 2 are subjected to electromagnetic forces in an upward vertical direction because of the magnetic fields generated on the first and second coil parts and the currents flowing through the elastic parts 2, and thus the actuating unit 1 connected to the elastic parts 2 is operated in an upward vertical direction.

When the elastic parts 2 are restored to their original position due to restoring forces, the actuating unit 1 operated in this way and connected to the elastic parts 2 is also restored to its original state.

FIG. 3 shows that the actuating unit 1 is operated in an upward vertical direction by changing the directions of currents, flowing through the conductive coils 3 of the first coil part and the second coil part, and the currents, flowing through the elastic parts 2, to directions opposite those of FIG. 2, respectively.

Figure 4:
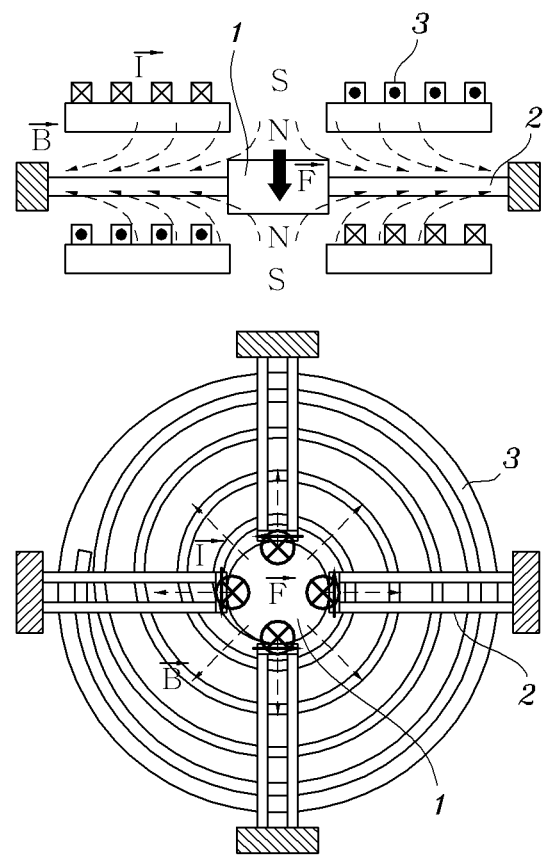
FIGS. 4 and 5 are views showing embodiments of an operating method according to the present invention, which show in detail the movement operation of the actuating unit in a downward vertical direction.
Figure 5:
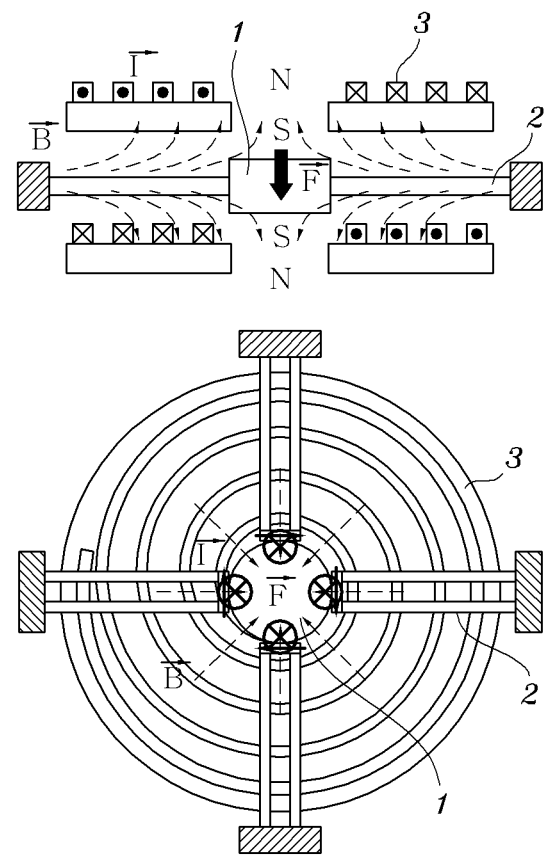

FIGS. 4 and 5 are diagrams showing embodiments of an operating method according to the present invention, which show in detail the movement operation of the actuating unit 1 in a downward vertical direction.

As shown in FIG. 4, when clockwise current is caused to flow through the coils of the first coil part and counterclockwise current is caused to flow through the coils of the second coil part, magnetic fields are formed on the first coil part and the second coil part towards the elastic parts 2. However, since the magnetic fields formed towards the elastic parts 2 have the same polarity, they repel each other, thus enabling the magnetic fields to be formed in opposite directions around the actuating unit 1. When the currents are caused to flow through the elastic parts 2, as shown in FIG. 4, the elastic parts 2 are subjected to electromagnetic forces in a downward vertical direction due to magnetic fields generated on the first coil part and the second coil part and the currents flowing through the elastic parts 2, and thus the actuating unit 1 connected to the elastic parts 2 is operated in a downward vertical direction.

FIG. 5 shows that the actuating unit 1 is operated in a downward vertical direction by changing the directions of currents, flowing through the coils 3 of the first coil part and the second coil part, and currents, flowing through the elastic parts 2, to directions opposite those of FIG. 4, respectively.

Figure 6:
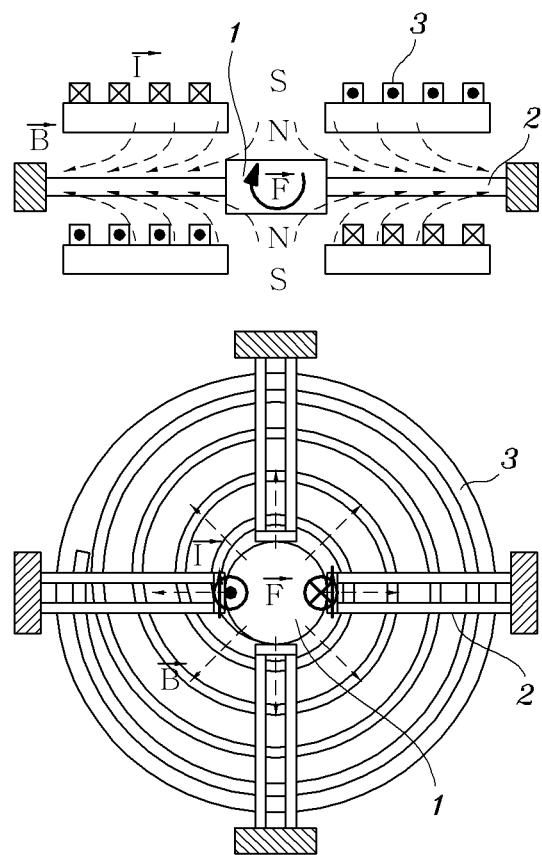
FIGS. 6 and 7 are views showing embodiments of an operating method according to the present invention, which show in detail the rotational operation of the actuating unit in a clockwise direction.
Figure 7:
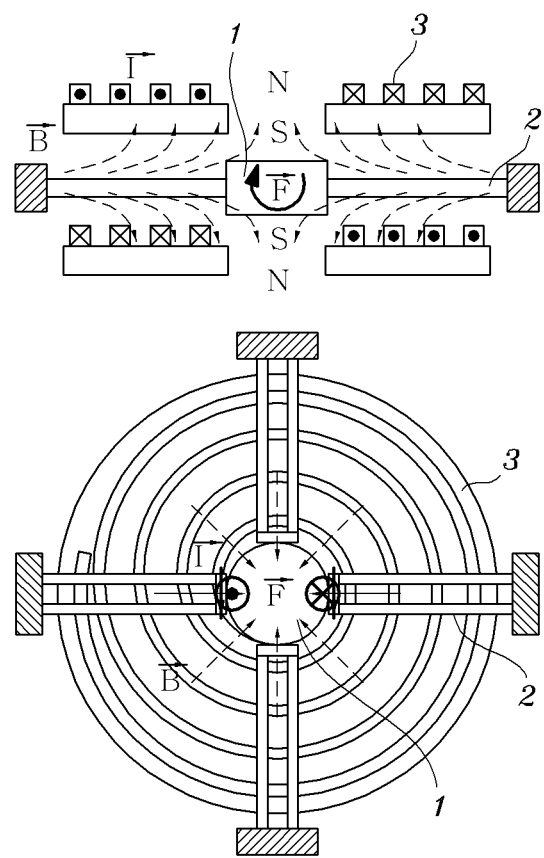

FIGS. 6 and 7 are views showing embodiments of an operating method according to the present invention, which show in detail the rotational operation of the actuating unit 1 in a clockwise direction.

First, in FIG. 6, when clockwise current is caused to flow through the coils of the first coil part and counterclockwise current is caused to flow through the coils of the second coil part, magnetic fields are formed on the first and second coil parts towards the elastic parts 2. However, since the magnetic fields formed towards the elastic parts 2 have the same polarity, they repel each other, thus enabling the magnetic fields to be formed in opposite directions around the actuating unit 1.

As shown in FIG. 6, when current is caused to flow through only the elastic parts 2, which are horizontally connected to the actuating unit 1, in the same direction, the elastic part 2 connected to the left of the actuating unit 1 is subjected to an electromagnetic force in an upward vertical direction and the elastic part 2 connected to the right of the actuating unit 1 is subjected to an electromagnetic force in a downward vertical direction due to the magnetic fields formed on the first and second coil parts and the currents flowing through the elastic parts 2, and thus the actuating unit 1 connected to the elastic parts 2 rotates clockwise.

FIG. 7 shows that the actuating unit 1 is operated clockwise by changing the directions of currents, flowing through the coils 3 of the first coil part and the second coil part, and the currents, flowing through the elastic parts 2, to directions opposite those of FIG. 6.

Figure 8:
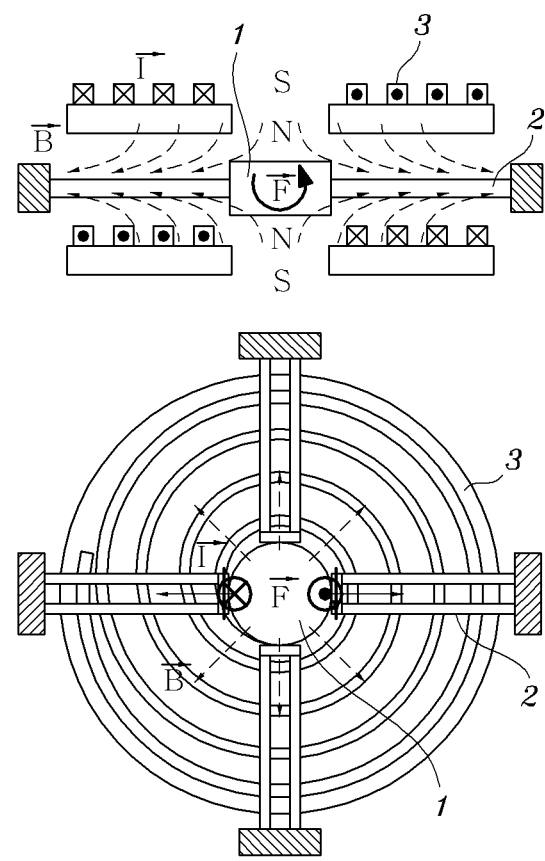
FIGS. 8 and 9 are views showing embodiments of an operating method according to the present invention, which show in detail the rotational operation of the actuating unit in a counterclockwise direction.
Figure 9:
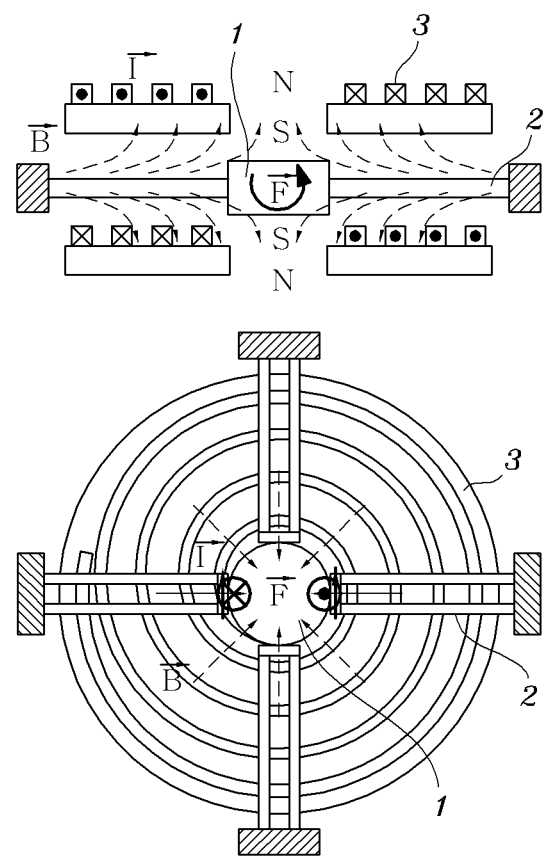

FIGS. 8 and 9 are views showing embodiments of an operating method according to the present invention, which show in detail the rotational operation of the actuating unit 1 in a counterclockwise direction.

In FIG. 8, when clockwise current is caused to flow through the coils of the first coil part and counterclockwise current is caused to flow through the coils of the second coil part, magnetic fields are formed on the first and second coil parts towards the elastic parts 2. However, since the magnetic fields formed towards the elastic parts 2 have the same polarity, they repel each other, thus enabling the magnetic fields to be formed in opposite directions around the actuating unit 1. As shown in FIG. 8, when current is caused to flow through only elastic parts, which are horizontally connected to the actuating unit 1, in the same direction, the elastic part 2 connected to the left of the actuating unit 1 is subjected to an electromagnetic force in a downward vertical direction and the elastic part 2 connected to the right of the actuating unit 1 is subjected to an electromagnetic force in an upward vertical direction due to the magnetic fields generated on the first and second coil parts and the currents flowing through the elastic parts 2, and thus the actuating unit 1 connected to the elastic parts 2 rotates counterclockwise.

FIG. 9 shows that the actuating unit 1 is operated counterclockwise by changing the directions of currents, flowing through the coils 3 of the first and second coil parts, and currents, flowing through the elastic parts 2, to directions opposite those of FIG. 8.

Figure 10:
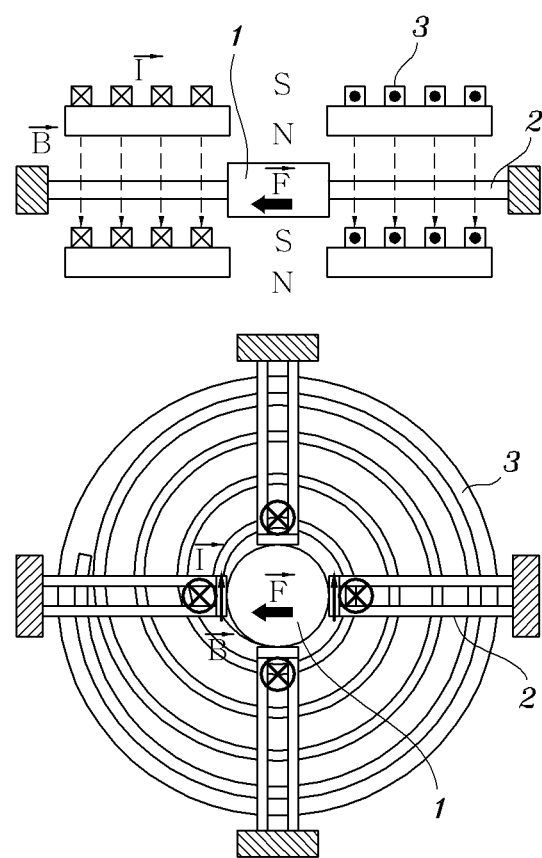
FIGS. 10 and 11 are views showing embodiments of an operating method according to the present invention, which show in detail the movement operation of the actuating unit in a leftward horizontal direction.
Figure 11:
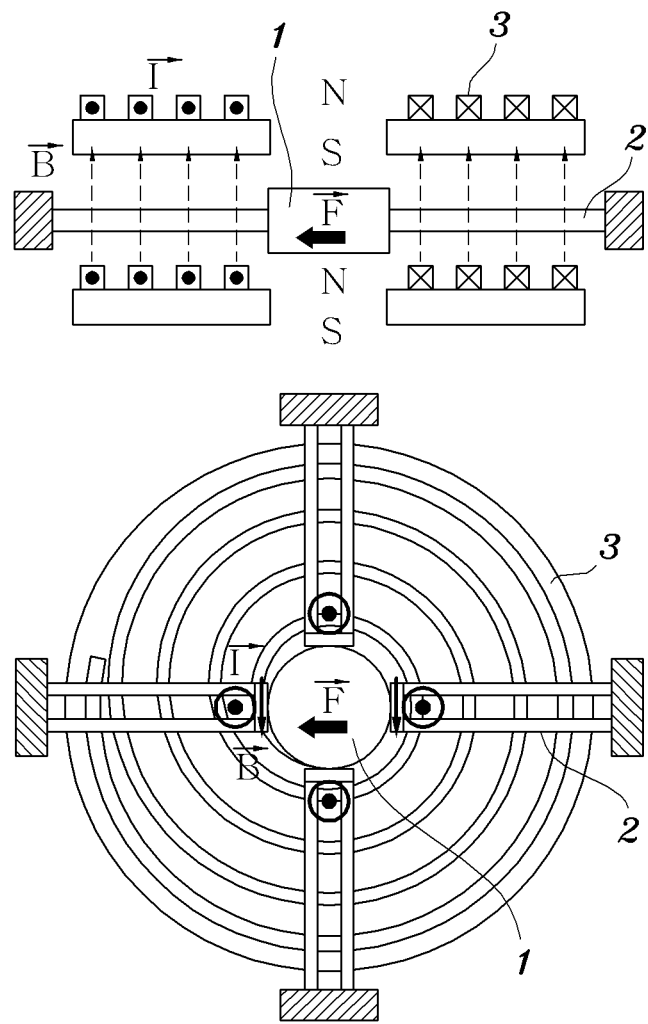
Figure 12:
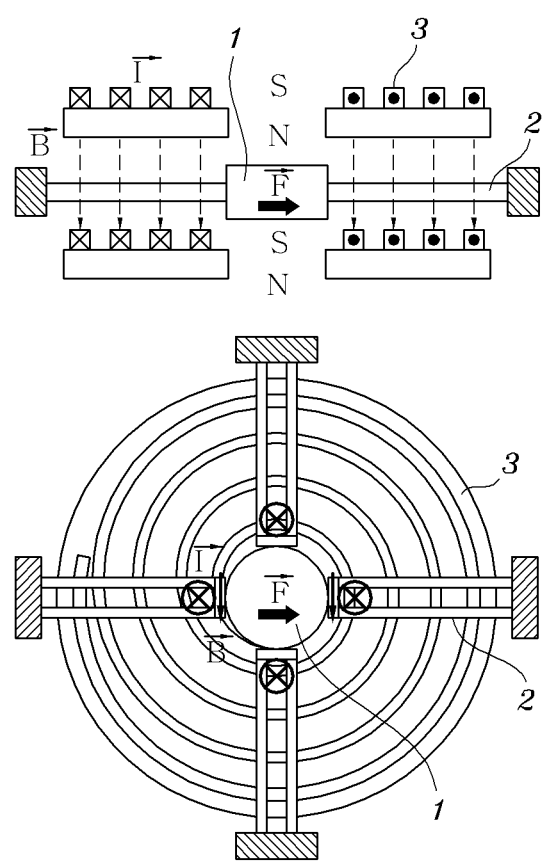
FIGS. 12 and 13 are views showing embodiments of an operating method according to the present invention, which show in detail the movement operation of the actuating unit in a rightward horizontal direction.
Figure 13:
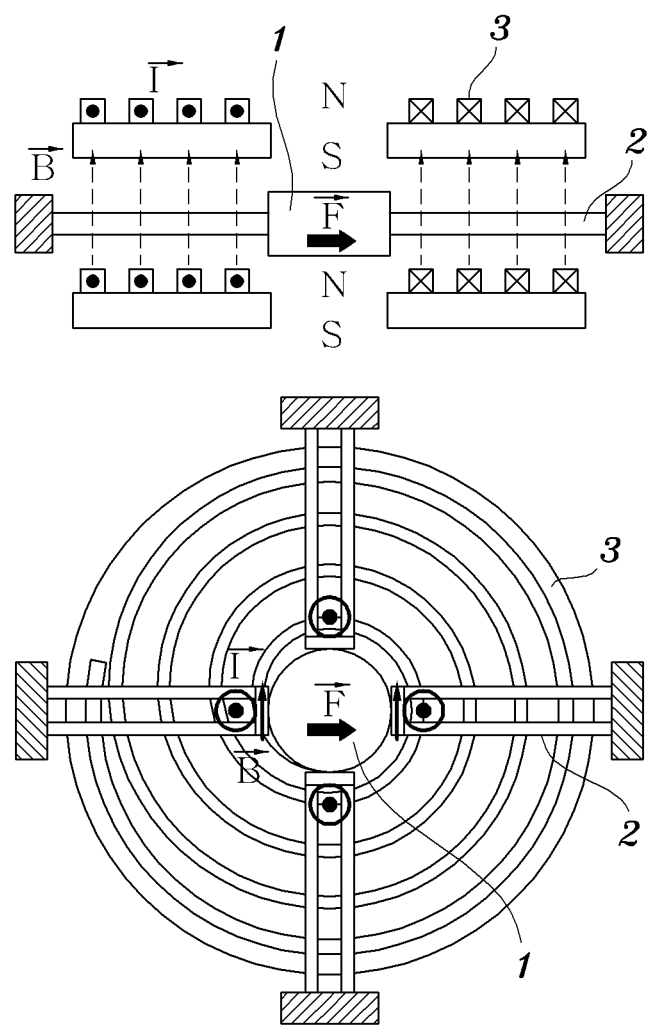

FIGS. 10 to 13 are views showing embodiments of an operating method according to the present invention, wherein FIGS. 10 and 11 illustrate the movement operation of the actuating unit 1 in a leftward horizontal direction, and FIGS. 12 and 13 illustrate the movement operation of the actuating unit 1 in a rightward horizontal direction.

First, in FIG. 10, when clockwise current is caused to flow through the conductive coils of the first coil part and the second coil part, magnetic fields are formed on the first and second coil parts in a downward vertical direction. As shown in FIG. 10, when current is caused to flow through only the elastic parts 2, which are horizontally connected to the actuating unit 1, in the same direction, the elastic parts 2 are subjected to an electromagnetic force in a leftward horizontal direction due to the magnetic fields generated on the first and second coil parts and the currents flowing through the elastic parts 2, and thus the actuating unit 1 connected to the elastic parts 2 is operated in a leftward horizontal direction.

FIG. 12 shows that the actuating unit 1 is operated in a rightward horizontal direction by changing the direction of only the current flowing through the elastic parts 2 of FIG. 10 to a direction opposite that of FIG. 10.

FIGS. 11 and 13 show that the actuating unit 1 is horizontally operated by changing the directions of currents, flowing through the coils 3 of the first coil part and the second coil part, and the currents, flowing through the elastic parts 2, to directions opposite those of FIG. 12.

Figure 14:
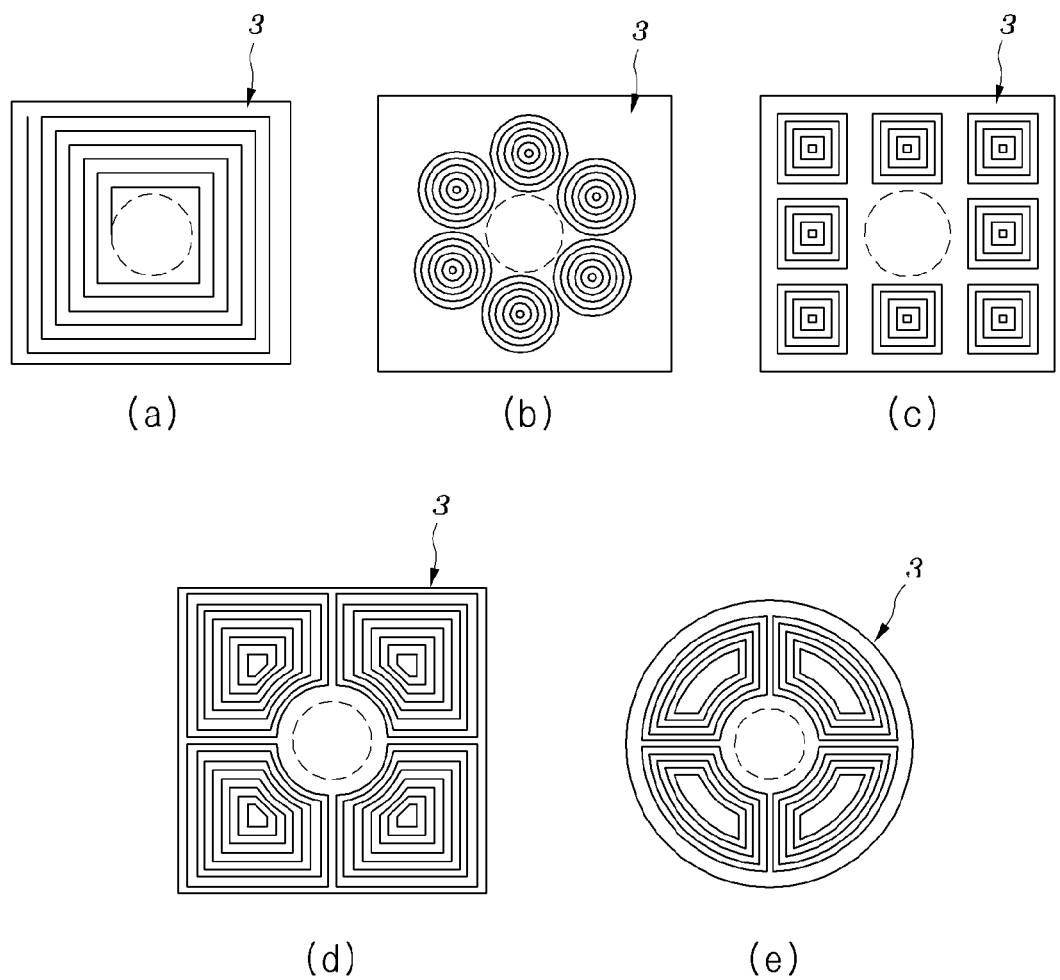
FIG. 14 is a view showing examples of various shapes of conductive coils on coil substrates.

FIG. 14 is a view showing examples of various shapes of coils.

FIG. 14(*a*) illustrates a shape in which a conductive coil is arranged in a rectangular shape around a through hole formed in a coil substrate.

FIG. 14(*b*) illustrates a shape in which a plurality of circular conductive coils is arranged in a circular shape around a through hole.

As shown in FIG. 14(*b*), the circular conductive coils are arranged in a circular shape around the through hole, so that individual control for each conductive coil, that is, an operation of individually generating an electromagnetic force on each conductive coil, is performed, thus enabling the motion of the actuating unit to be more precisely controlled.

FIG. 14(*c*) illustrates a shape in which a plurality of rectangular conductive coils is arranged in a rectangular shape around a through hole.

Similarly, the rectangular conductive coils are arranged in a rectangular shape around the through hole, so that individual control for each conductive coil, that is, an operation of individually generating an electromagnetic force on each conductive coil, is performed, thus enabling the motion of the actuating unit to be more precisely controlled.

FIG. 14(d) illustrates a shape in which a plurality of rectangular conductive coils is arranged in respective quadrants around a through hole.

As shown in the drawing, portions of conductive coils coming into contact with the through hole are depressed in the outward direction of the coil substrate. That is, the intensities of magnetic fields are adjusted by forming the intervals between specific portions of each conductive coil to be dense, thus enabling the motion of the actuating unit to be more precisely controlled.

FIG. 14(e) illustrates a shape in which a plurality of fan-shaped conductive coils is arranged in respective quadrants around a through hole.

As shown in the drawing, the shapes of coil substrates are circular, and portions of conductive coils coming into contact with the through hole are depressed in the outward direction of the coil substrate. Similarly, the intensities of magnetic fields are adjusted by forming the intervals between specific portions of the conductive coils to be dense, thus enabling the motion of the actuating unit to be more precisely controlled.

A plurality of coil substrates, on which conductive coils of various shapes are formed, as shown in FIG. 14, may be formed in such a way as to be stacked. In particular, as in the case of FIGS. 14(b), (c), (d) and (e), when a plurality of spiral coils is formed on a single substrate, and a plurality of these substrates is stacked, conductive coils at the same position in respective layers are electrically connected to each other.

For example, when conductive coils are spirally formed in four quadrants of each substrate, and a plurality of these coil substrates is stacked, conductive coils formed in the first quadrant in respective layers are electrically connected to each other. This is equally applied to the conductive coils formed in second to fourth quadrants.

In this case, currents are selectively applied to conductive coils formed in respective quadrants, so that the magnitudes or directions of the currents are adjusted, and thus the motion of the actuating unit can be controlled.

Although an electromagnetic multi-axis actuator according to the present invention has been described with reference to the attached drawings, those skilled in the art will appreciate that the present invention is not limited by the embodiments and drawings disclosed in the present specification, and can be variously applied without departing from the scope and spirit of the invention.

As described above, an electromagnetic multi-axis actuator according to the present invention may drive an actuating unit in a multi-axis manner with a minute displacement, and thus can be usefully applied to optical industrial fields using very small objects, such as micro lenses, as an actuating unit, fields of mobile phones and small-sized portable devices, fields of electronic devices, and fields of components for electronic devices.

The invention claimed is:

1. An electromagnetic multi-axis actuator, comprising:
   an actuating unit capable of being driven in a multi-axis manner;
   one or more elastic parts connected to the actuating unit and made of a conductive material; and
   one or more coil substrates disposed either above or below or both above and below the elastic parts and provided with conductive coils formed thereon to faun magnetic fields around the elastic parts.

2. The electromagnetic multi-axis actuator according to claim 1, wherein the elastic parts are configured such that a plurality of elastic parts is symmetrically or asymmetrically connected to the actuating unit around the actuating unit.

3. The electromagnetic multi-axis actuator according to claim 1, wherein the elastic parts form current flow paths in such a way as to partially insulate metal through anodization or to partially etch and insulate the metal through chemical etching.

4. The electromagnetic multi-axis actuator according to claim 1, further comprising a supporting part enabling the elastic parts to be fixed thereto.

5. The electromagnetic multi-axis actuator according to claim 4, wherein each of the elastic parts comprises a portion formed in a direction from outside to a center of a corresponding coil substrate so that the elastic part crosses part of the coil substrate.

6. The electromagnetic multi-axis actuator according to claim 5, wherein each of the elastic parts comprises a first branch part extending from the supporting part and coming into contact with the actuating unit, and a second branch part connected to the first branch part and configured to come into contact with the actuating unit and extend to the supporting part.

7. The electromagnetic multi-axis actuator according to claim 1, wherein each of the elastic parts is made of a conductor or a magnetic material, or is formed by applying a conductive material to a surface of the elastic part.

8. The electromagnetic multi-axis actuator according to claim 1, wherein each of the coil substrates comprises:
   a substrate made of an insulator; and
   one or more conductive coils spirally formed on one side or both sides of the substrate, or inside of the substrate.

9. The electromagnetic multi-axis actuator according to claim 8, wherein the substrate has a through hole formed in a center portion thereof.

10. The electromagnetic multi-axis actuator according to claim 9, wherein the conductive coils are formed around the through hole of the substrate in shapes of one or more circular spirals or polygonal spirals.

11. The electromagnetic multi-axis actuator according to claim 10, wherein the conductive coils are respectively formed in four quadrants of the substrate.

12. The electromagnetic multi-axis actuator according to claim 1, wherein the conductive coils are manufactured through one of inkjet printing, screen printing, lithography, anodization, optical processing, and electrochemical plating methods.

13. The electromagnetic multi-axis actuator according to claim 8, wherein the substrate is made of a ceramic material.

14. The electromagnetic multi-axis actuator according to claim 13, wherein the substrate contains one or more of silicon oxide (SiO2), boron oxide (B2O3), calcium oxide (CaO), Magnesium Oxide (MgO), and aluminum oxide (Al2O3).

15. The electromagnetic multi-axis actuator according to claim 8, wherein the substrate is made of a magnetic material.

16. The electromagnetic multi-axis actuator according to claim 15, wherein the magnetic material contains two or more of iron (Fe), cobalt (Co), nickel (Ni), manganese (Mn), magnesium (Mg), zinc (Zn), and copper (Cu).

17. The electromagnetic multi-axis actuator according to claim 1, wherein the coil substrates are vertically stacked.

18. The electromagnetic multi-axis actuator according to claim 17, wherein one of the vertically stacked coil substrates is electrically connected to another neighboring coil substrate through a via hole.

19. The electromagnetic multi-axis actuator according to claim 17, wherein conductive coils are spirally formed in four quadrants of each of the vertically stacked coil substrates, and conductive coils in a same quadrant on respective layers are electrically connected to each other.

20. The electromagnetic multi-axis actuator according to claim 19, wherein the multi-axis actuator controls motion of the actuating unit by adjusting magnitudes or directions of currents applied to the conductive coils formed in respective quadrants.

* * * * *